United States Patent

Wilsey et al.

(10) Patent No.: US 7,605,842 B2
(45) Date of Patent: Oct. 20, 2009

(54) VEHICULAR OPTICAL COMMUNICATIONS SYSTEM

(75) Inventors: Philip A. Wilsey, Cincinnati, OH (US); Dale E. Martin, Cincinnati, OH (US); Darryl S. Dieckman, Cincinnati, OH (US); Fred R. Beyette, Jr., Cincinnati, OH (US)

(73) Assignee: Clifton Labs, Inc., Cincinnati, OH (US)

( * ) Notice: Subject to any disclaimer, the term of this patent is extended or adjusted under 35 U.S.C. 154(b) by 1189 days.

(21) Appl. No.: 10/964,942

(22) Filed: Oct. 14, 2004

(65) Prior Publication Data

US 2005/0129410 A1    Jun. 16, 2005

Related U.S. Application Data

(60) Provisional application No. 60/529,431, filed on Dec. 12, 2003.

(51) Int. Cl.
*H04N 7/18* (2006.01)

(52) U.S. Cl. .................. 348/148; 348/14.02; 348/159; 348/143; 340/902; 340/995.12; 340/426.16; 725/75; 725/76; 725/77

(58) Field of Classification Search .............. 348/148, 348/14.02, 159, 143; 340/902, 995.12, 426.16; 725/75, 76, 77
See application file for complete search history.

(56) References Cited

U.S. PATENT DOCUMENTS

| 5,412,381 | A | 5/1995 | Dicks |
| 5,696,503 | A | 12/1997 | Nasburg |
| 6,064,318 | A | 5/2000 | Kirchner, III et al. |
| 6,253,064 | B1 * | 6/2001 | Monroe .................. 455/66.1 |
| 6,373,851 | B1 | 4/2002 | Dadario |
| 7,040,435 | B1 * | 5/2006 | Lesesky et al. ............ 180/167 |

* cited by examiner

*Primary Examiner*—Shawn An
(74) *Attorney, Agent, or Firm*—Guerin & Rodriguez, LLP; William G. Guerin

(57) ABSTRACT

Described are a vehicle optical communications system and network to exchange high bandwidth optical data between vehicles or between a vehicle and a stationary host. The vehicle optical communications system includes a communications module and a sensor having pixels for detecting an image in a field of view. Each pixel can generate a pixel data signal responsive to an incident optical data signal that includes vehicle data transmitted from a remote optical transmitter. The communications module provides remote data in response to the pixel data signals. The vehicular communications system optionally includes an optical transmitter to enable bi-directional communication. Data can be transmitted through a multi-node network of vehicular communication systems deployed in vehicles or on stationary hosts located between or around the data transmitter and intended data receiver. Simultaneous data from multiple optical transmitters within the sensor field of view are processed concurrently and maintained as separate communication channels.

6 Claims, 5 Drawing Sheets

VEHICULAR OPTICAL COMMUNICATIONS SYSTEM

RELATED APPLICATIONS

This application claims the benefit of the filing date of U.S. Provisional Application Ser. No. 60/529,431, filed Dec. 12, 2003, titled "Communication Imagers for Automotive Safety Applications," the entirety of which provisional application is incorporated by reference herein.

FIELD OF THE INVENTION

The invention relates generally to vehicular communications. More particularly, the invention relates to optical communications between moving vehicles and optical communications between a moving vehicle and a stationary host.

BACKGROUND

Providing information to vehicles such as automobiles traveling on highways and other roads is typically accomplished using roadside signs, radio traffic reports and the like. Conventional roadside signs convey static information. Other roadside signs display dynamic information such as near real time reporting of traffic delays. Unfortunately, such signs often do not relay sufficient information to vehicles to enable drivers to make informed decisions regarding alternate routes. Moreover, there is a delay between the occurrence of a road hazard (e.g., traffic delay, construction, weather) and the update of the sign or traffic report.

Safety is another area that is restricted by the inability to rapidly convey vehicle information to a driver. For example, if traffic has abruptly stopped, often the only warning to following vehicles is the sudden illumination of brake lights on the vehicles immediately in front. Thus drivers generally are not aware of the traffic hazard when the first affected vehicles apply their brakes.

Still another area limited by information transfer rates is general information such as advertisements for local businesses (e.g., restaurants and lodging). Many such businesses may not advertise along the roadway or local zoning may prohibit their display of advertisement signs. For businesses that do utilize roadside advertisements, the information is generally limited. Advertisements often do not provide important information to passengers such as prices, hours of operation and product availability (e.g., hotel vacancy status). Although such information is often available through the Internet, passengers typically do not have access to these Internet resources through their vehicles.

Trains, aircraft and other vehicles are similarly limited in their ability to receive information. The desired information can relate to events affecting schedule and safety. Moreover, passengers on these vehicles may desire access to other types of information such as airline and railway schedules, weather and business information for passenger destinations, and the like.

What is needed is a communications system capable of high bandwidth data communications between vehicles or between a vehicle and a host to permit the exchange of static and dynamic information. The present invention satisfies this need and provides additional advantages.

SUMMARY OF THE INVENTION

In one aspect, the invention features a vehicular optical communications system including a sensor and a communications module. The sensor has a plurality of pixels and detects an image in a field of view. Each pixel is configured to generate a pixel data signal in response to an optical data signal including vehicle data generated by a remote optical transmitter in a respective pixel field of view. The communications module is in communication with the sensor and provides remote data in response to the pixel data signal generated by one or more of the pixels. In one embodiment, the vehicular optical communications system also includes an optical transmitter in communication with the communications module. The optical transmitter generates an optical data signal including data for transmission from a vehicle to a remote sensor.

In another aspect, the invention features a vehicular optical communications network including a first and a second optical transmitter, a first and a second sensor, and a communications module. The first optical transmitter generates a first optical data signal including vehicle data. The first sensor has a plurality of pixels and detects an image in a first sensor field of view. Each pixel of the first sensor is configured to generate a pixel data signal in response to the first optical data signal if the first optical transmitter is in a respective pixel field of view. The communications module is in communication with the first sensor and generates a data signal in response to the pixel data signal generated by at least one of the pixels. The second optical transmitter is in communication with the communications module and generates a second optical data signal for transmission to a remote sensor. The second sensor has a plurality of pixels and detects an image in a second sensor field of view. Each pixel of the second sensor is configured to generate a pixel data signal in response to the second optical data signal if the second optical transmitter is in a respective pixel field of view.

In another aspect, the invention features a vehicular optical communications system including a plurality of optical detectors and a communications module. Each optical detector is adapted to sense an optical data signal including vehicle data from a remote optical transmitter in a field of view. Each optical detector is configured to provide a field of view in a predetermined direction and to generate a data signal responsive to the optical data signal. The communications module is in communication with the optical detectors and provides remote data in response to the data signal generated by at least one of the optical detectors.

In another aspect, the invention features a method for vehicular communication. The method includes transmitting an optical data signal comprising vehicle data from a vehicle to a remote sensor having a plurality of pixels, generating a pixel data signal at the remote sensor in response to the transmitted optical data signal and determining the vehicle data based on the pixel data signal.

In another aspect, the invention features a method for vehicular communication that includes transmitting an optical data signal comprising vehicle data to a first vehicle having a sensor including a plurality of pixels and determining that the optical data signal incident on at least one of the pixels is intended for a second vehicle. The method also includes transmitting the optical data signal from the first vehicle to a sensor including a plurality of pixels at the second vehicle.

In yet another aspect, the invention features a vehicular optical communications system including a detecting means and a processing means. The detecting means detects an image in a field of view and detects at least one optical data signal generated by a remote optical transmitter in the field of view. The detecting means generates a pixel data signal for each detected optical data signal. The processing means is in communication with the detecting means and provides remote data in response to each pixel data signal generated by the detecting means.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the present invention features a vehicular communications system to exchange high bandwidth optical data between vehicles or between a vehicle and a stationary host. As used herein, vehicle means any conventional mobile host such as a car, bus, van, automobile, truck, aircraft and train. Other means of transportation such as humans carrying devices supporting optical communications are also contemplated as vehicles according to the principles of the invention. The vehicular communications system includes a communications module in communication with a sensor having an array of pixels. Each pixel is configured to generate a pixel data signal in response to an incident optical communication signal from a remote optical transmitter in the pixel's field of view. The communications module provides remote data in response to one or more pixel data signals generated by the sensor. The vehicular communications system optionally includes an optical transmitter to enable bi-directional communication with a remote vehicle communication system installed in a vehicle or on a stationary host.

Data can be transmitted between two or more systems through a multi-node network of vehicular communication systems deployed in other vehicles or on stationary hosts located between or around the data transmitter and intended data receiver. Optical data received simultaneously from multiple optical transmitters within the sensor field of view are processed concurrently and maintained as separate communication channels. Moreover, a vehicle communications system can serve as a node for multiple communication channels originating and terminating at other vehicles.

Advantageously, passengers have access to a wide variety of data including, for example, traffic and safety information, vehicle location and guidance data, commercial information, and Internet based resources. In addition, vehicles equipped with an optical transmitter enable passengers in the vehicle to issue requests for information specific to their needs.

Figure 1:
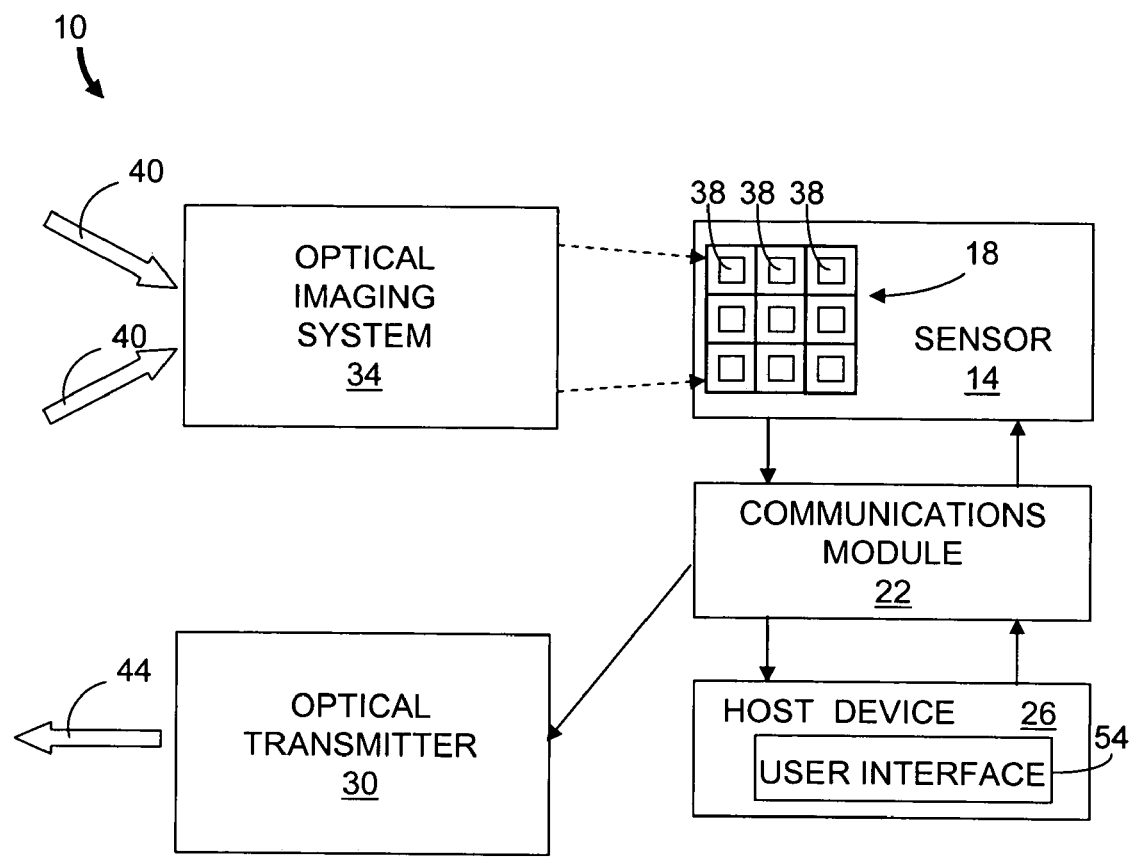
FIG. 1 is a block diagram of an embodiment of a vehicular communications system in accordance with the invention.

FIG. 1 is a block diagram of a vehicular communications system 10 in accordance with an embodiment of the invention. The system 10 is attached to a vehicle such as an automobile or a stationary host such as a roadside host. The position of the system 10 on a vehicle should afford an unobstructed line of sight to vehicle communication systems attached to other vehicles and stationary hosts. A stationary host can be a structure such as a tower, a building and the like. Preferably, the stationary host is located near a roadway to provide an unobstructed line of sight to vehicles traveling along the roadway. The system 10 includes a sensor 14 in communication with a communications module 22 and in optical communication with an imaging system 34 (e.g., lens system). The sensor 14 includes an array 18 of pixels 38. The communications module 22 may include, for example, a central processing unit (CPU), a field programmable gate array (FPGA), various integrated circuits and the like for processing data signals and controlling operation of the sensor 14 and other subsystems. The illustrated system 10 also includes a host device 26 and an optional optical transmitter 30 each in communication with the communications module 22.

The imaging system 34 generates a scene image on the pixel array 18. Each pixel 38 simultaneously captures video data representing the scene in the field of view of the array 18 and optical communications data generated by one or more remote optical transmitters. Video data is generated at typical video rates (e.g., 30 fps) while the communications channels can operate at higher data rates (e.g., 10 Mbps per channel). Remote optical transmitters emit high bandwidth optical signals 40 that are incident on a pixel 38 or cluster of pixels 38. Each optical signal 40 generates a substantially higher local intensity on the pixel 38, or the cluster of pixels 38, than the intensity at pixels 38 detecting only a typical scene background. Remote optical transmitters are tracked using algorithms implemented in the communications module 22. In other embodiments, the algorithms are implemented in the host device 26 or in processing hardware integrated with the sensor 14. Thus optical data is not lost as a remote optical transmitter moves within the field of view of the sensor 14 due to relative motion between the remote optical transmitter and the vehicle communications system 10. An optical data signal 44 emitted by the optical transmitter 30 is transmitted to one or more remote vehicular communications systems. The optical transmitter 30 includes an optical source (e.g., one or more light emitting diodes (LEDs)) that can be modulated at the communication data rate according to a signal provided by the communications module. According to another embodiment (not shown), the optical transmitter 30 is modulated by a control signal provided by the host device 26.

One example of a sensor 14 and communications module 22 implementation providing video and communications capabilities suitable for vehicular communications networks according to the invention is the optical communications imager described in U.S. patent application Ser. No. 10/305,626 filed Nov. 27, 2002 and U.S. patent application Ser. No. 10/306,555 filed Nov. 27, 2002, which are incorporated herein by reference.

Figure 2:
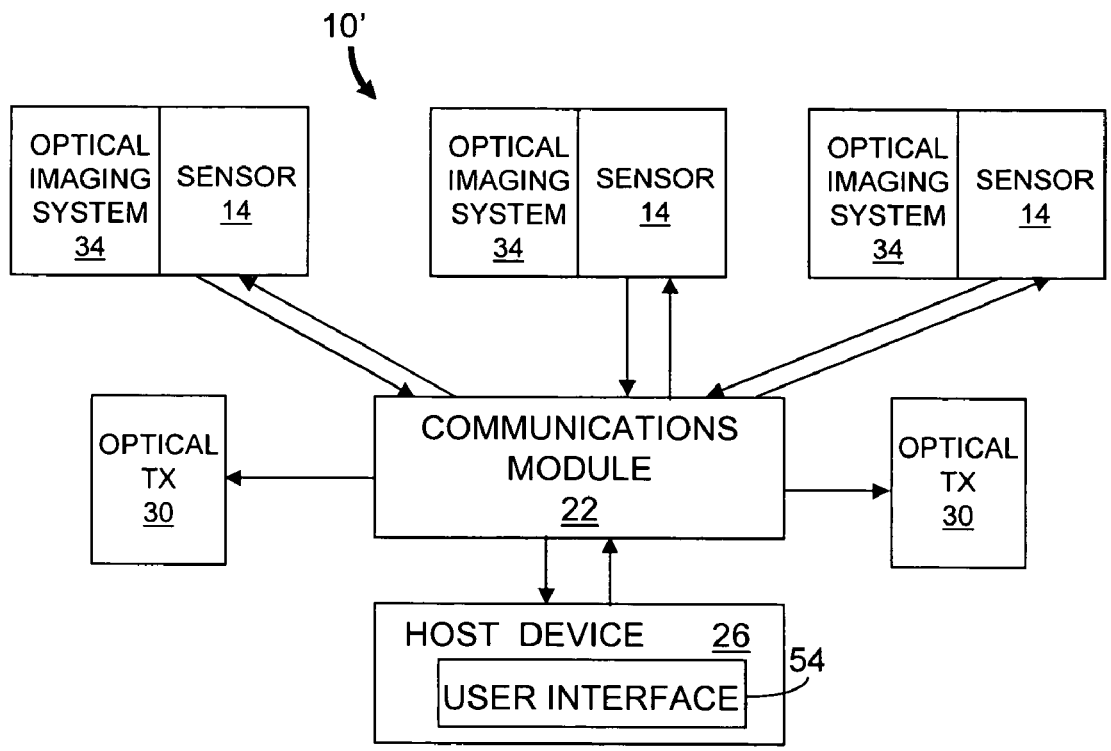
FIG. 2 is an illustration of another embodiment of a vehicular communications system in accordance with the invention.
Figure 3:
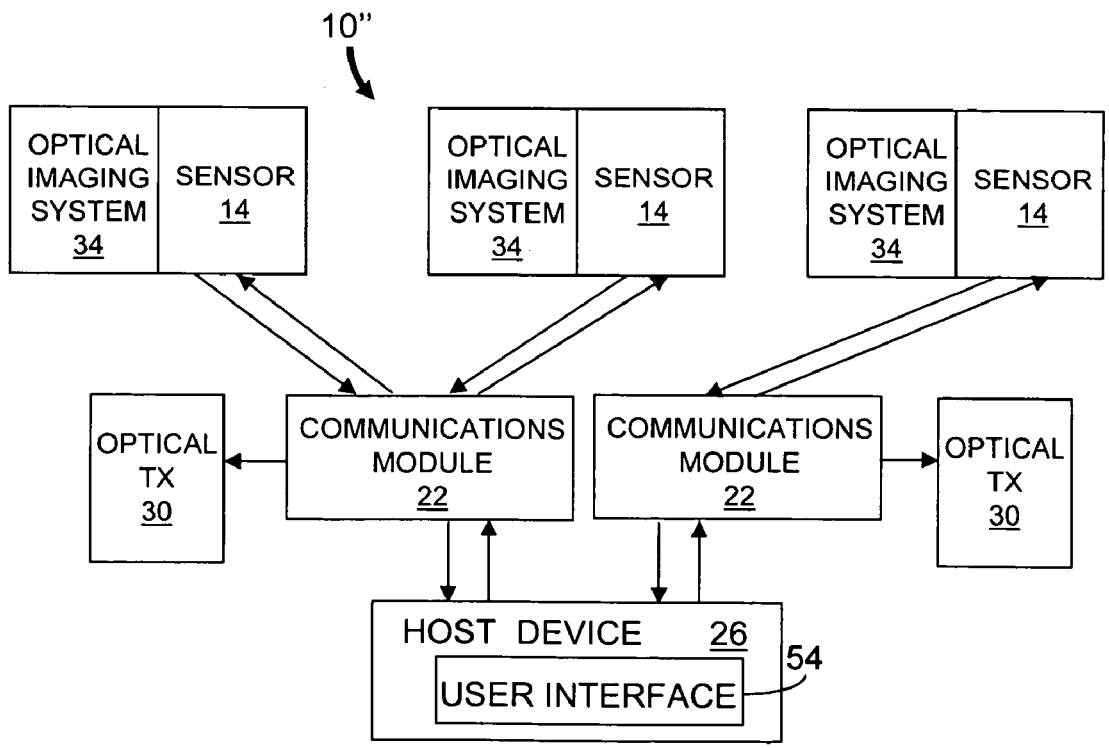
FIG. 3 is an illustration of another embodiment of a vehicular communications system in accordance with the invention.

In a preferred embodiment depicted in the functional block diagram of FIG. 2, a vehicular communications system 10' includes multiple sensors 14 and optical imaging systems 34 arranged on the vehicle to receive optical communications data and video data from remote optical transmitters and scenes, respectively, in predetermined directions with respect to the vehicle. For example, sensors 14 can be positioned on the front, back and sides of an automobile to receive optical communications data from vehicles traveling in front, behind and alongside the host vehicle. One or more sensors 14 can be mounted on the top of the host vehicle to receive optical communications data from air traffic, overhead signs and roadside transmitters. The system 10 also includes multiple optical transmitters 30 arranged on the vehicle to transmit optical communications data to other vehicles in predetermined directions. In an alternative embodiment shown in FIG. 3, the vehicular communications system 10" includes multiple communications modules 22. Each communications module 22 communicates with at least one of the sensors 14. Advantageously, each communications module 22 can be adapted to process a particular type or format of communications data or video data. For example, one communications module 22 can process roadway and traffic information, and can be used for recording this information for possible later review in a manner similar to that employed by "black box recorders" used in commercial airliners. Another communications module 22 can be used as part of an interface to the Internet. One or more communications modules 22 can be used to control video on demand communications. In other implementations, duplicate communications modules 22 can be used, for example, to improve reliability or to overcome bandwidth limitations of a single module 22.

The present invention also contemplates a vehicular communications system in which the sensor 14 is replaced by individual detectors and the optical imaging system 34 is replaced by an optical imaging component (e.g. lenses or lens systems) for each detector. Each detector and optical imaging component is positioned to provide a field of view in a predetermined direction. The detector and optical imaging component pairs can be arranged relative to the other detectors and optical imaging component pairs to provide contiguous fields of view, i.e., there are no gaps between the fields of view. Alternatively, the detector and optical imaging component pairs can be arranged relative to each other to establish fields of view in distinct directions that are independent of the other fields of view.

Figure 4:
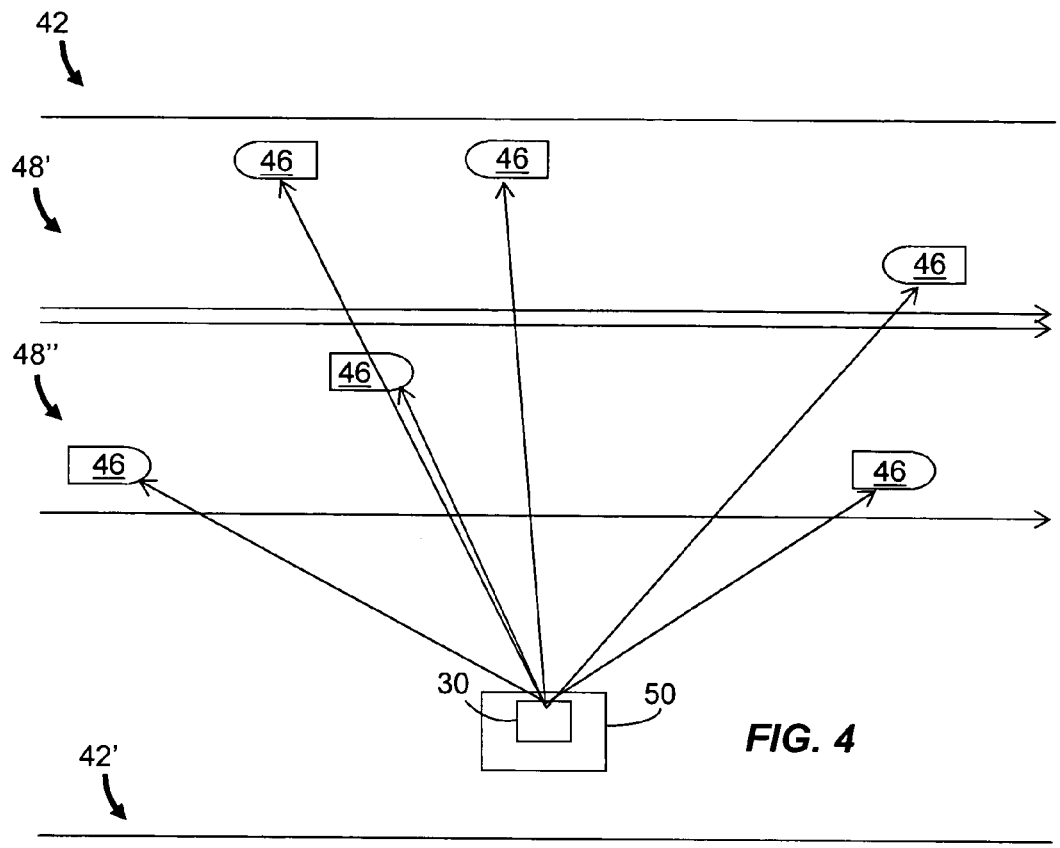
FIG. 4 is an illustration of an embodiment of a vehicular communications network in accordance with the invention.

FIG. 4 illustrates a vehicular communications network 42 according to one embodiment of the invention. Vehicles 46 (i.e., automobiles) are shown traveling to the left and right along an upper portion 48' and lower portion 48", respectively, (shown as the upper two horizontal lines and lower two horizontal lines, respectively) of a highway 48. A roadside host 50 equipped with an optical transmitter 30 broadcasts a high bandwidth optical data signal having a beamwidth that overlaps a portion of the highway 48. The beamwidth can be defined by the divergence of the optical source or may be controlled by transmitter optics designed to achieve known optical power densities at various locations along the highway 48. Optionally, multiple optical transmitters 30 configured on the roadside host 50 with overlapping fields of view simultaneously transmit the optical data signal to achieve a larger broadcast zone. Vehicles 46 within the beamwidth and equipped with one or more receivers (i.e., sensor 14 and communications module 22) receive the broadcast optical signal and present the corresponding data to the vehicle occupants (i.e., driver and passengers) in a suitable format through a user interface 54 (see FIG. 1) such as a graphical display or audio system.

Data transmitted to the vehicles 46 can include traffic information, emergency alerts, weather hazards and commercial information. Traffic information can alert a driver to potential delays caused by heavy traffic and road repairs, and may suggest alternate routes. Commercial information can include advertisements for restaurants, hotels, automobile service facilities, and the like. In another example, the roadside host 50 communicates with traffic monitoring equipment such as radar-based speed measurement devices, weather sensors, road surface monitors and the like. In this example, transmitted data can warn the operators of vehicles traveling at speeds that are in excess of posted limits or speeds that are otherwise unsafe for current road conditions.

Figure 5:
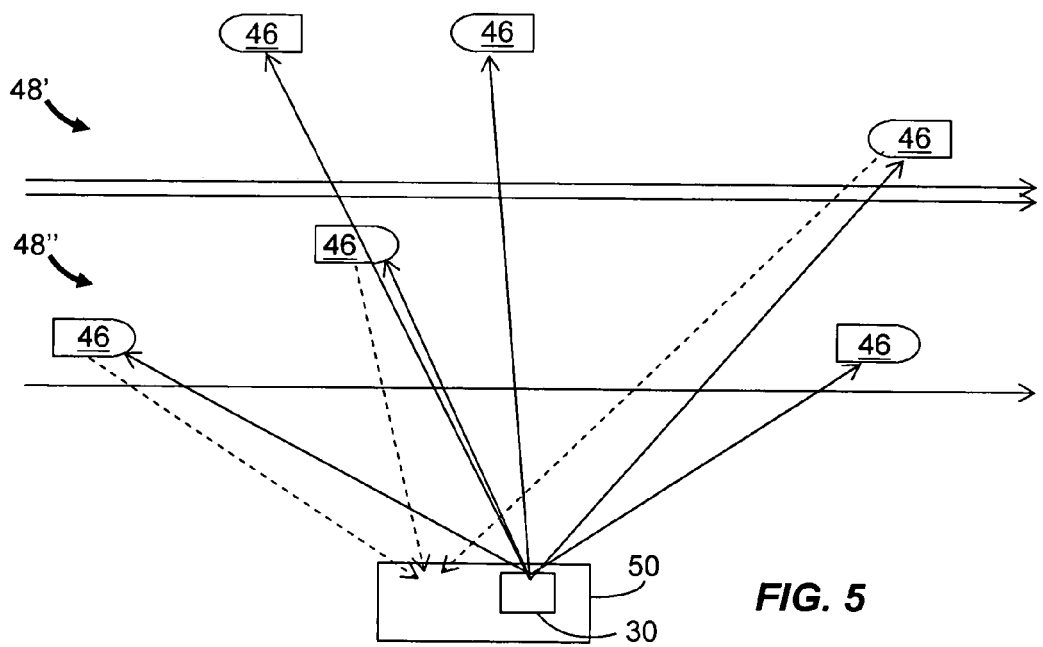
FIG. 5 is an illustration of another embodiment of a vehicular communications network in accordance with the invention.

FIG. 5 depicts a vehicular communications network 42' in which a portion of the vehicles 46 are equipped with optical transmitters 30 for bi-directional communications with the roadside host 50. Each of the vehicles 46 in the beamwidth of the optical signal and equipped with a sensor 18 can receive the optical data broadcast from the bi-directional vehicular communications system 10 of the roadside host 50 as shown by the solid arrows. Each vehicle 46 having a bi-directional vehicular communications system 10 can transmit vehicle data to the roadside host 50 as shown by the dashed arrows. Vehicle data can include information of any type and may include requests for specific information. For example, passengers can submit queries to determine the name and location of local hotels, restaurants and service facilities. The roadside host 50 can respond with the requested information based on a local processor and database. Alternatively, the roadside host 50 may provide Internet access so that the passengers can "surf the Internet" to obtain the desired information. In another alternative, the roadside host 50 supports telephone communications between a passenger and a person utilizing a landline telephone or wireless services.

Figure 6:
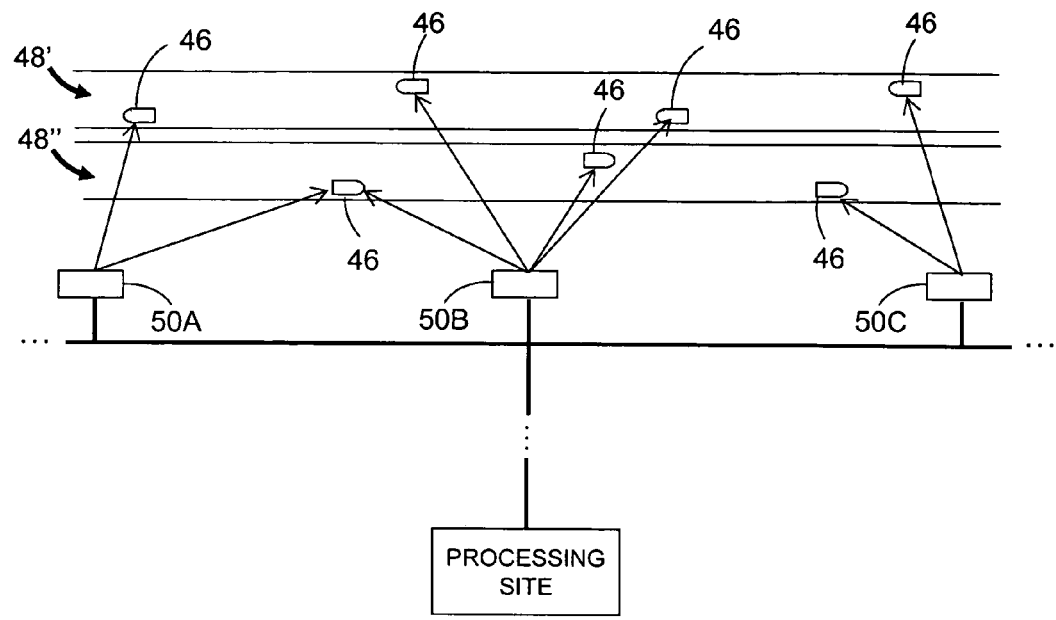
FIG. 6 is an illustration of an embodiment of networked roadside hosts for increased optical signal coverage according to the invention.

FIG. 6 illustrates a network of roadside hosts 50 linked to provide greater geographical coverage. A processing site 52 manages the network and coordinates simultaneous communication channels. Free-space optical communications are generally limited to line of sight paths, therefore the locations of roadside hosts 50 are chosen to reduce or eliminate gaps in coverage. For example, roadside hosts 50 can be located on hilltops and tall buildings to provide visibility to more vehicles 46. In some instances, geographical limitations may prevent wide coverage by a single roadside host 50. Moreover, the line of sight between vehicles 46 and the roadside host 50 can change in time, for example, by changing weather conditions such as fog or precipitation. Although only three roadside hosts 50 are shown for clarity, any number of roadside hosts 50 can be networked to increase the broadcast area. For example, a vehicle 46 traveling to the right does not lose communications with roadside host 50A until after entering the communication zone of roadside host 50B. Similarly, as the vehicle 46 continues travel, communications are established with the next roadside host 50C before communication with roadside host 50B is lost.

The illustrated network depicts uninterrupted communications coverage for vehicles 46. In other embodiments, the separation between roadside hosts 50 can be greater such that gaps in coverage occur. For example, in rural areas, locations with low commercial activity, low traffic volume or where otherwise cost prohibitive, it may be desirable to provide only occasional opportunities for communications between vehicles 46 and roadside hosts 50. Roadside hosts 50 may be many miles apart but still allow vehicle operators to make emergency communications or occasional requests for information.

Figure 7:
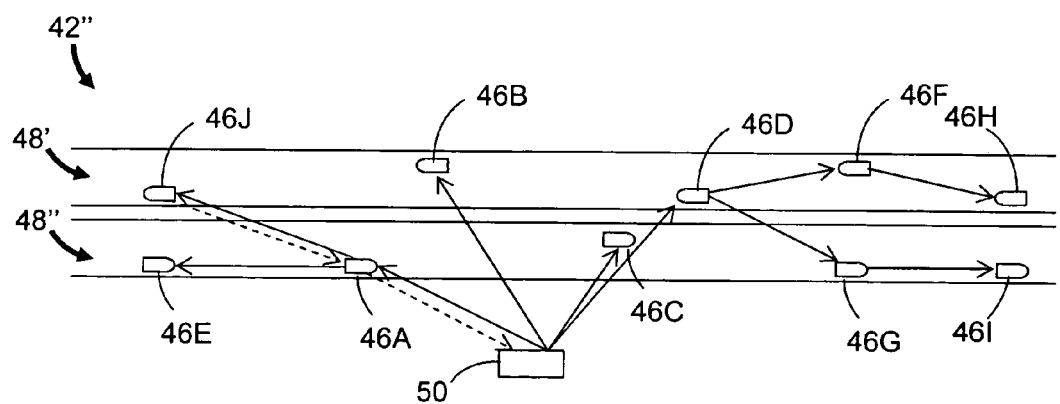
FIG. 7 is an illustration of another embodiment of a vehicular communications network in accordance with the invention.

FIG. 7 illustrates a vehicular communications network 42" in which the effective communications coverage area of a single roadside host 50 is effectively expanded using vehicles 46 to relay optical signals to other vehicles 46. In this embodiment, each vehicle 46 can communication directly with the roadside host 50 if the vehicle 46 is in the coverage area and each vehicle 46 can communicate with nearby vehicles 46 through line of sight communications. Similar to the broadcast environment described above for FIG. 4, the roadside host 50 communicates directly with vehicles 46A, 46B, 46C and 46D; however, other vehicles 46E, 46F, 46G, 46H, 46I and 46J are beyond the broadcast area. The vehicular communication system 10 installed in vehicle 46A receives the optical data from the roadside host 50 and re-transmits the optical data for reception by vehicles 46E and 46J. Similarly, vehicle 46D receives and retransmits optical data for reception by vehicles 46F and 46G. Vehicles 46H and 46I receive the optical data after retransmission by vehicles 46F and 46G, respectively. Although the maximum number of intervening nodes shown for this "peer to peer" relay network is two (for data paths between the roadside host 50 and either vehicle 46H or vehicle 46I), it should be understood that the number of intervening nodes, or communication "hops," can be greater to extend the range of the roadside host 50 to greater distances. Consequently, communication between the roadside host 50 and a vehicle 46 may be possible although there may not be a line of sight path or if the optical signal intensity from a line of sight path is too weak due to distance or weather conditions.

Optical data can be transmitted from a vehicle 46 to the roadside host 50 in a similar manner. For example, vehicle 46J sends optical data (indicated by dashed arrows) requesting specific information. The optical data is received by vehicle 46A and relayed to the roadside host 50. Data responsive to the request is transmitted from the roadside host 50 to vehicle 46A which relays the optical data to vehicle 46J. Although not shown in FIG. 7, a vehicle 46 relaying optical data in one direction is not necessarily used to relay optical data in the reverse direction for the same bi-directional communication link. For example, the responsive data could be received by vehicle 46B and relayed to vehicle 46J. Moreover, the network 42" can be dynamically reconfigured by changing over time the vehicles 46 used as intervening nodes in a communication link. This dynamic reconfiguration accommodates the changes in the relative positions of the vehicles 46 and the changing positions of the vehicles 46 relative to the roadside host 50. Importantly, each sensor 14 and communications module 22 can receive and process multiple optical signals. Consequently, a vehicle 46 (e.g., vehicle 46D as shown) can be a relay for multiple communication links.

Figure 8:
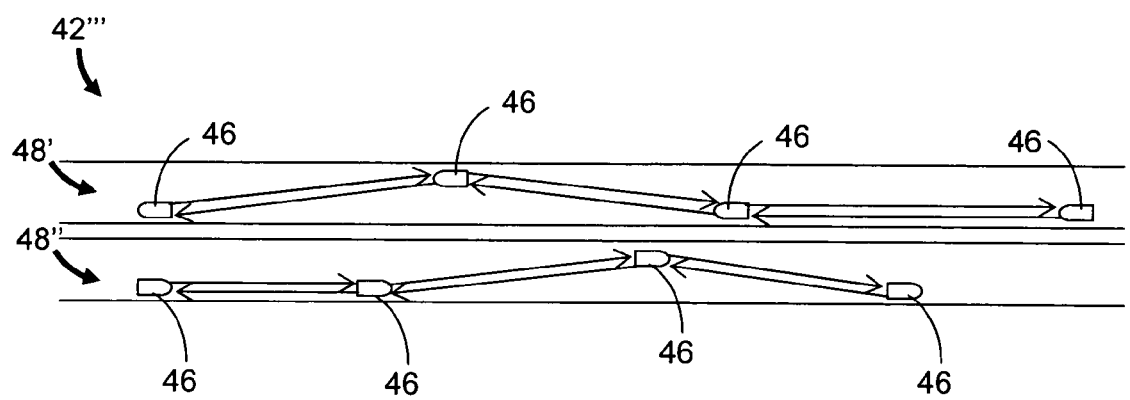
FIG. 8 is an illustration of another embodiment of a vehicular communications network in accordance with the invention.

FIG. 8 depicts a vehicular communications network 42''' for the exchange of vehicle data between vehicles 46. Vehicle data can include information of any type to be transmitted between vehicles 46. Vehicle data can include, for example, the location, speed, acceleration, bearing and identification of each transmitting vehicle 46. Location may be determined using a global positioning system (GPS) receiver installed in the vehicle 46. Bi-directional communications are established and maintained for all equipped vehicles 46 having an unobstructed line of sight to each other as indicated by the arrows. In addition, vehicles 46 can serve as nodes in communications links between other vehicles 46 as described above to transmit and receive vehicle data with other vehicles 46 not within a line of sight. The exchange of vehicle data enables the guidance of vehicles and enhances driver awareness of road and traffic conditions. For example, if a driver applies brakes abruptly, operators in following vehicles 46 are provided with an audible warning to increase reaction time. In another example, if the distance between two vehicles 46 is determined to be unsafe based on their speeds, a warning is provided to the drivers. In still another example, the vehicular communications system 10 includes a vehicle guidance module which receives self-guidance data from the communications module 22 and responds by generating one or more guidance signals. The guidance signals are used to control the operation of the vehicle 46 such as turning the vehicle 46 or altering vehicle speed. Advantageously, the high bandwidth communications, the ability to relay optical signals and the parallel processing of multiple communications channels allows many vehicles 46 to be simultaneously monitored thereby increasing passenger safety.

Image data provided by the sensor 14 can be used in conjunction with communications data to aid in guidance of the vehicle 46. Image processing algorithms implemented in the communications module 22 detect known features in the video data to confirm proper vehicle course. Moreover, position information and traffic data provided from roadside hosts 50 complement the video data for self guidance. Optionally, reflectors mounted along roadway features provide self guidance data. For example, reflectors embedded in a road surface or mounted on a guardrail or roadway structure can modulate and retroreflect an optical signal transmitted by a vehicle 46. The modulated and reflected optical signal can include an identifier associated with a known location. The location of the reflected signal in the field of view of the sensor 14 can be compared to the known position to determine any variation in the vehicle course. Alternatively, the reflected optical signal can provide general information, such as a "mile marker" value.

In one implementation, a reflector includes an optical modulator and a retroreflective optical element to modulate and return an optical signal back to a transmitting vehicle 22 along the original optical signal path. Preferably, a steering or scanning element in the optical transmitter steers the optical signal beam over a defined field of view to permit communication with one or more reflectors. Advantageously, the data in the modulated optical signal returned to the transmitting vehicle 22 is more secure than data transmitted in a broadcast optical signal. In one variation of this method, the optical signal transmitted from the vehicle 46 to the reflector is modulated to provide information to a roadside host 50 and the modulation imparted by the reflector is a second modulation of the optical signal.

While the invention has been shown and described with reference to specific preferred embodiments, it should be understood by those skilled in the art that various changes in form and detail may be made therein without departing from the spirit and scope of the invention as defined by the following claims. For example, the embodiments descibed above primarily refer to vehicular communications networks for automobiles, but it should be recognized that the principles of the invention also extend to other types of vehicular communications such as aircraft communications and railway communications. Moreover, vehicular communications networks can include communications between or among a combination of various types of vehicles and portable devices.

What is claimed is:

1. A vehicular optical communications network, comprising:
   a vehicle optical transmitter for generating a vehicle optical data signal comprising vehicle data;
   a vehicle sensor having a plurality of pixels and detecting an image in a vehicle sensor field of view, each pixel configured to generate a pixel data signal responsive to a remote optical data signal if a remote optical transmitter is in a respective pixel field of view;
   a vehicle communications module in communication with the vehicle sensor, the vehicle communications module generating a data signal responsive to the pixel data signal generated by at least one of the pixels of the vehicle sensor;

a remote optical transmitter for generating a remote optical data signal comprising remote data;

a remote sensor having a plurality of pixels and detecting an image in a remote sensor field of view, each of the pixels of the remote sensor configured to generate a pixel data signal responsive to the vehicle optical data signal if the vehicle optical transmitter is in a respective pixel field of view; and a remote communications module in communication with the remote sensor, the remote communications module generating a data signal responsive to the pixel data signal generated by at least one of the pixels of the remote sensor.

2. The vehicular optical communications network of claim 1 wherein the vehicle communications module is in communication with the vehicle optical transmitter.

3. The vehicular optical communications network of claim 1 wherein the remote communications module is in communication with the remote optical transmitter.

4. The vehicular optical communications network of claim 1 wherein the vehicle data comprise at least one of identification data, location data, telephone data and self guidance data.

5. The vehicular optical communications network of claim 1 wherein the remote data comprise at least one of identification data, location data, routing data, commercial data, telephone data and self guidance data.

6. The vehicular optical communications network of claim 1 further comprising a vehicle guidance module in communication with the vehicle communications module, the vehicle guidance module generating at least one guidance signal for controlling operation of a vehicle in response to the remote data.

* * * * *